(12) United States Patent
Danelski

(10) Patent No.: US 6,762,681 B1
(45) Date of Patent: Jul. 13, 2004

(54) ZONELESS ORDER FULFILLMENT SYSTEM WITH PICKER IDENTIFICATION

(75) Inventor: Darin L. Danelski, Palmyra, WI (US)

(73) Assignee: Innovative Picking Technologies, Inc., Dousman, WI (US)

( * ) Notice: Subject to any disclaimer, the term of this patent is extended or adjusted under 35 U.S.C. 154(b) by 0 days.

(21) Appl. No.: 09/969,056

(22) Filed: Oct. 2, 2001

(51) Int. Cl.[7] ............................................. G08B 13/14
(52) U.S. Cl. .................... 340/568.1; 340/570; 340/571; 340/5.2; 340/5.61; 705/22; 705/23
(58) Field of Search ........................... 340/568.1, 570, 340/571, 573.3, 573.4, 593, 825.36, 332, 5.2, 5.6, 5.61, 5.21, 5.23; 705/22, 23, 26, 404, 405

(56) References Cited

U.S. PATENT DOCUMENTS

| | | | | |
|---|---|---|---|---|
| 4,598,275 A | * | 7/1986 | Ross et al. ................. | 340/5.61 |
| 5,151,684 A | * | 9/1992 | Johnsen ..................... | 340/5.92 |
| 5,812,986 A | * | 9/1998 | Danelski ..................... | 705/22 |
| 5,886,634 A | * | 3/1999 | Muhme .................... | 340/572.1 |

* cited by examiner

*Primary Examiner*—Daniel J. Wu
*Assistant Examiner*—Son Tang
(74) *Attorney, Agent, or Firm*—Boyle Fredrickson Newholm Stein & Gratz S.C.

(57) ABSTRACT

An identification arrangement for an order fulfillment system includes an identification input associated with each location in an order fulfillment system at which items are handled, such as by removal or placement, for filling an order. Each item storage location includes a switch that is actuated by a user after items have been handled, such as by removing the items for placement into an order receptacle, as in a conventional pick-to-light order fulfillment system. The identification input includes a unique signal emitter carried by the user, such as an infrared transmitter which emits a signal having a unique frequency corresponding to the identity of the user. The signal is received by a signal receiver located adjacent the switch, and which is interconnected with a central controller that stores information on the signals used as identification for each user. The user can remove items from any location in the order fulfillment area to fill any order. The identification information is utilized to track user productivity and accuracy in filling orders.

15 Claims, 2 Drawing Sheets

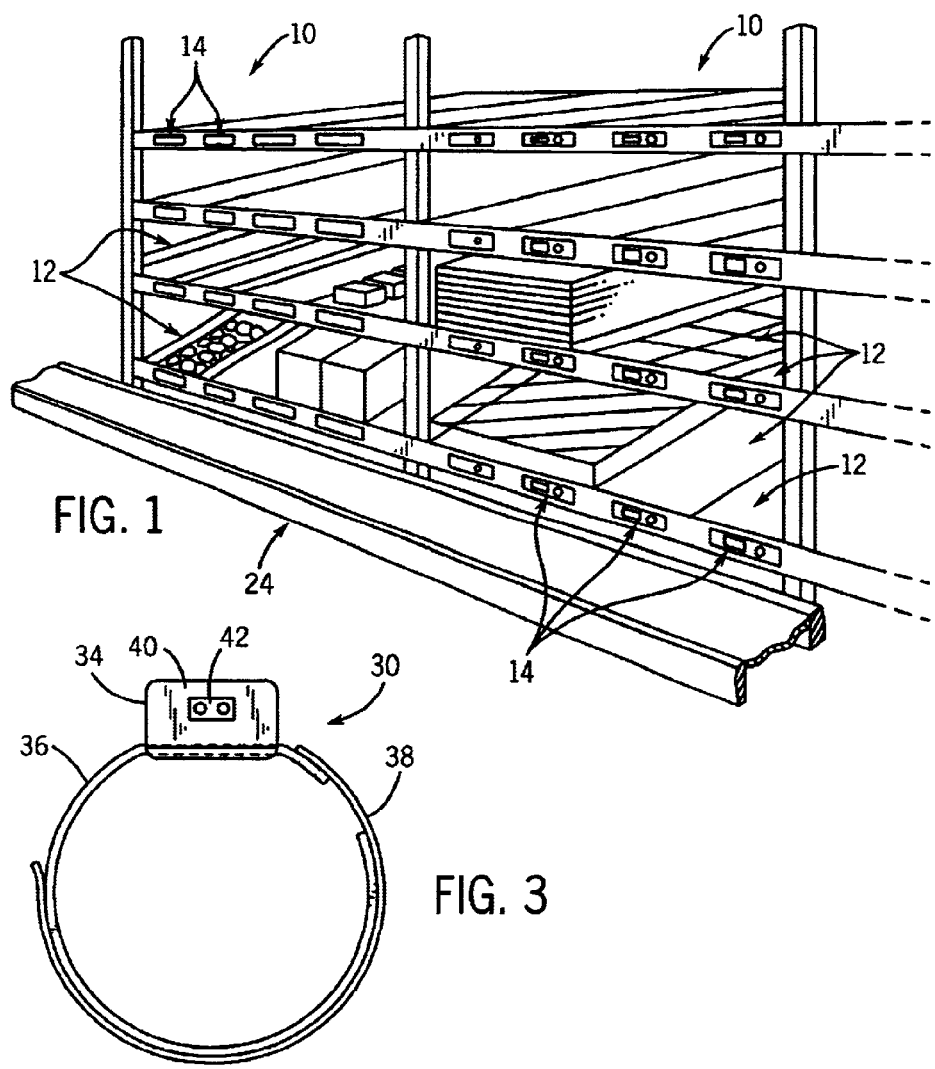
FIG. 1
FIG. 3
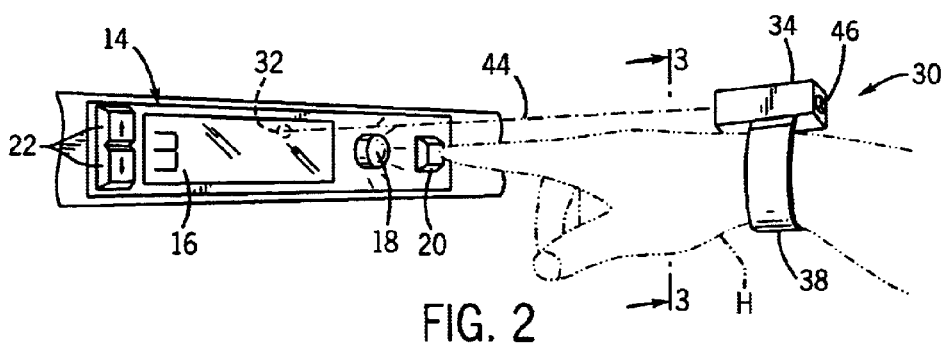
FIG. 2

ZONELESS ORDER FULFILLMENT SYSTEM WITH PICKER IDENTIFICATION

BACKGROUND AND SUMMARY OF THE INVENTION

This invention relates to order fulfillment systems, and more particularly to a manual order fulfillment system in which orders are filled by manually removing items from storage locations and placing the items into receptacles, each of which is adapted to contain an order.

Conventional manual order fulfillment systems involve items placed on storage racks within an area. The storage racks are typically divided into zones, and each zone is manned by an individual typically known as a "picker". Order receptacles, such as boxes, are typically passed from zone to zone by movement on a roller conveyor or the like. When the order receptacle is in a particular zone, the picker manually fills the order by removing the required number of the selected items within the picker's zone and placing the items into the order receptacle. When all of the selected items within the zone have been placed into the order receptacle, the picker passes the receptacle to the next zone, and the process is repeated until the entire order is filled.

This type of system can involve significant inefficiencies, in that certain pick zones may have very heavy pick requirements while others may have very light pick requirements. This can result in some pickers working very hard while others do very little. This can also result in significant bottle necks in the order fulfillment system, in the event one or more pickers are subjected to extended periods of heavy pick requirements.

To solve this problem, zoneless order fulfillment systems have been developed. In systems of this type, pickers are not assigned to predetermined zones. Instead, each picker can pick items from any location for placement into an order receptacle or receptacles located in the order fulfillment area. This type of order fulfillment system typically incorporates a "pick-to-light" feature, which utilizes visual light indicators which function in combination with a display which provides order identification information. Typically, a flashing light appears adjacent an order number in an item location, to alert a picker as to the location and number of items to be placed into an order receptacle. Once the picker has removed the items from the location and placed the items into the order receptacle, the picker actuates a switch to terminate the light signal. Simultaneously, actuation of the switch is communicated to a central controller to indicate that the items have been picked and placed into an order receptacle. The controller then continues to send signals to the area to guide the pickers through the area and to provide visual indications as to the locations of additional items to be picked for placement into the order receptacles.

While this type of order fulfillment system eliminates certain problems associated with zone-type order fulfillment systems, problems can nonetheless arise in that the pickers are not accountable. That is, certain pickers may work very hard and fill many orders in a short amount of time, whereas other pickers may be less productive. Further, it is difficult and time consuming to identify the source of an error in filling an order.

It is an object of the present invention to provide an order fulfillment system which provides accountability of order fulfillment personnel. It is a further object of the invention to provide an order fulfillment system which is capable of identifying order fulfillment personnel responsible for filling individual orders, in order to track productivity of order fulfillment personnel and to identify order fulfillment personnel responsible for errors in filling orders. Yet another object of the invention is to provide such a system which can be utilized in conjunction with existing zoneless-type order fulfillment systems. Still a further object of the invention is to provide such an order fulfillment system which is relatively simple in its components and operation, and which does not significantly increase the overall cost of the system. A still further object of the invention is to provide such an order fulfillment system which is highly accurate in identifying order fulfillment personnel and which utilizes existing components incorporated in zoneless order fulfillment systems.

In accordance with the invention, an order fulfillment system is provided for use by a number of different users in filling orders within an area containing items at various distinct locations. The system includes an indicator arrangement associated with each location for providing an indication to a user that one or more items are to be removed from the location for placement into an order receptacle. An identifying arrangement is associated with each location, for ascertaining and recording the identity of each user removing items from the location to fill an order.

The identifying arrangement is in the form of a unique identification member carried by each user, in combination with a transceiving and recording arrangement associated with each location. The transceiving and recording arrangement interacts with the unique identification member to ascertain the identity of the user removing items from the location. In a preferred form, the unique identification member emits a unique signal, such as an Rf or infrared signal, which is received by the transceiving and recording arrangement. The signal emitter may be carried by the user in any satisfactory manner, such as by attaching the signal emitter to the user in the vicinity of one of the user's hands.

The indicator arrangement may be similar to prior art light-emitting indicators, which provide a sensory indication to order-filling pickers that one or more items are to be removed from a location for placement into an order. A switch is provided at each location for shutting off the indicator after the items have been removed from the location and placed into the order receptacle. The transceiving and recording arrangement includes a transceiver located in the vicinity of the switch so that, when the user's hand is positioned so as to actuate the switch, the signal emitter is in a position in which the signal emitted by the signal emitter is received by the transceiver. The transceiver is interconnected with a processor or memory device, which stores information relative to the order and the identity of the picker. This information can then be used to track picker productivity and also to identify the source of any errors in filling orders. Economic incentives can then be offered for picker productivity and/or accuracy, and such information can be readily and accurately obtained from the processor.

The invention further contemplates a method of filling orders and an improvement in an order fulfillment system, in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is an isometric view of a portion of an order fulfillment area incorporating the picker identification system of the present invention;

FIG. 2 is a partial isometric view showing interaction of the components of the picker identification system incorporated in the order fulfillment area of FIG. 1;

FIG. 3 is an elevation view of a user-worn signal emitter carried by the user as shown in FIG. 2.

DETAILED DESCRIPTION OF THE INVENTION

Figure 4:
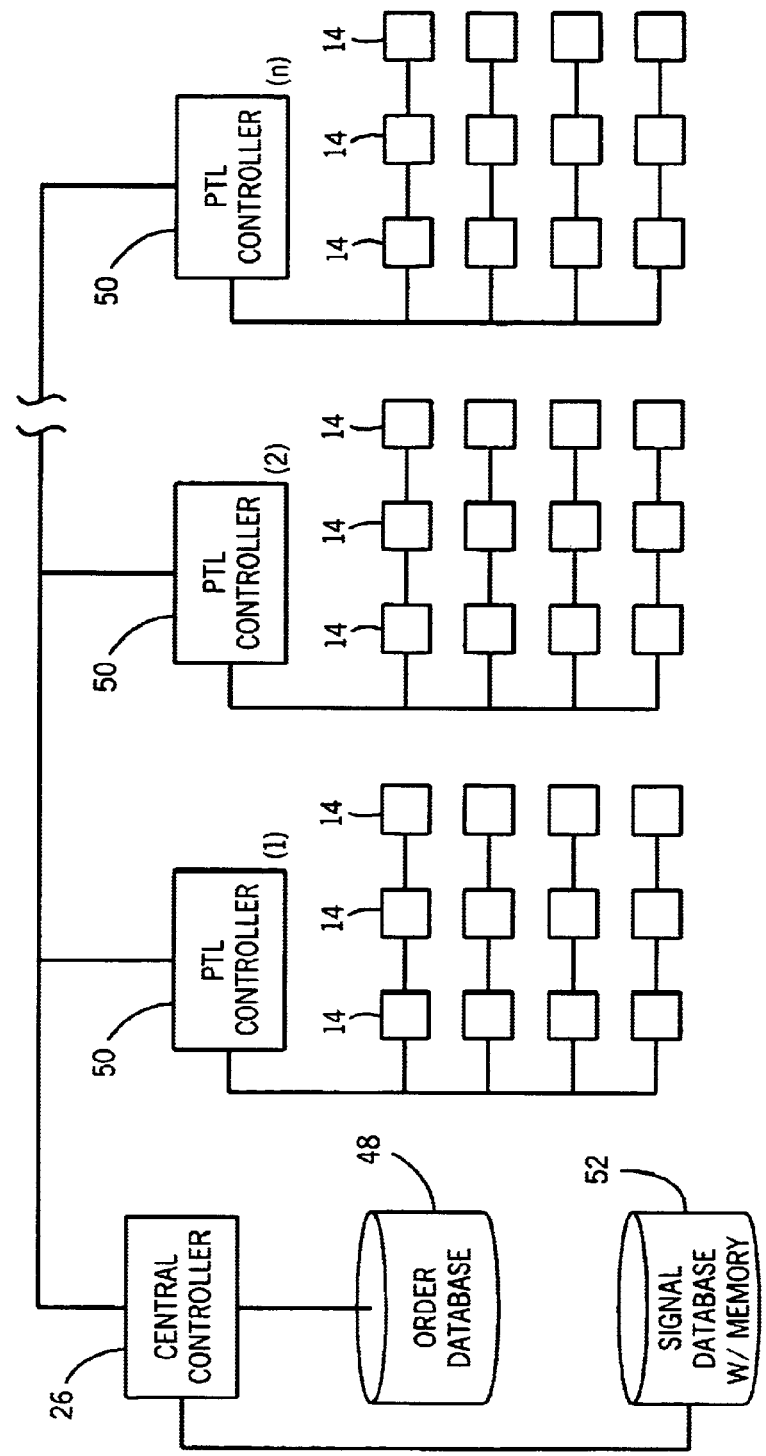
FIG. 4 is a schematic view of the picker identification system of FIG. 1.

With reference now to the drawing figures in which like reference numerals designate like parts throughout the disclosure, FIG. 1 illustrates a portion of an order fulfillment area within which the picker identification system in accordance with the invention is adapted to be used. The order fulfillment area generally includes a series of storage units, in the form of storage racks 10, each of which includes a series of shelves for supporting items to be placed into order receptacles. Each shelf is subdivided into a series of item storage locations, each of which supports a series of individual items adapted to be placed into various order receptacles to be filled within the order fulfillment area. The individual item storage locations are shown at 12. Each item storage location 12 supports boxes, bins, packages or individual ones of stock items which are capable of being selected and placed into an individual order receptacle, in a manner as is known.

A light directed order fulfillment system 11 is mounted to storage racks 10 for use in assisting individual users in filling orders with items from storage locations 12. A suitable light directed order fulfillment system 11 is available from Innovative Picking Technologies, Inc. of Dousman, Wis. under its designation ECONOPICK, although it is understood that other types of light directed systems may be employed. In a manner as is known, the light directed order fulfillment system 11 includes a series of pick modules 14, each of which is located at one of item storage locations 12. As shown in FIG. 2, each pick module 14 includes a display 16, an indicator light 18, a task complete switch 20, and up/down selector buttons 22. Pick modules 14 are mounted in a three-conductor bus rail which is connected to the fronts of storage racks 10 for providing power and data communication to each pick module 14. In a known manner, each pick module 14 is pre-assigned a unique serial number, which enables a system controller 26, which can take the form of a computer or other processor as shown in FIG. 4, to communicate order information to pick modules 14. The display based modules 14 show all required "picks" or numbers of items to be selected from a storage location 12 for each particular order. Once the user picks the appropriate number of items from the storage location 12 for placement into the order receptacle, such as a box, tote or the like, the user presses task complete switch 20 to extinguish indicator light 18. If additional orders are to be filled from the same location 12, indicator light 18 continues to flash until all orders are filled from that location.

As an alternative, a "light based" system may be employed in place of the "display based" system illustrated. In a light based system, an indicator light 18 is positioned at each location 12, together with a task complete switch 20. This type of system eliminates display 16 for each pick module 14, but rather utilizes a centrally located order control module (not shown) which displays order and quantity information.

As shown in FIG. 1, a roller conveyor 24 is located in front of storage racks 10, and is utilized to support order receptacles, such as boxes, which are moved through the storage area for receiving selected items to fill individual orders.

The above-described components are known, and are utilized to assist in filling orders in an order fulfillment area by identifying pick locations and quantities for orders being moved through the area. While a specific type of order fulfillment system 11 has been shown, it is understood that any other satisfactory type of light-based order fulfillment system may be employed, as known in the industry.

In accordance with the invention, an identification feature is incorporated into the order fulfillment system, for identifying each individual that removes items from each location for placement into an order. As best shown in FIG. 2, the invention generally includes an identification member 30 carried by a user, in combination with a transceiver 32 incorporated in pick module 14.

Identification member 30 is in the form of an infrared transmitter contained within a housing 34 secured to a flexible strap 36. A flexible band 38 is secured to the end of strap 36 at one end adjacent housing 34. Band 38 overlies strap 36, and a satisfactory retainer arrangement is interposed between band 38 and strap 36 for securing identification member 30 to the user. As shown, identification member 30 is engaged with the user's wrist in a manner similar to the manner in which a watch is worn, located adjacent the user's hand, shown representatively at H. Representatively, a Velcro® type hook and loop fastening arrangement may be interposed between strap 36 and band 38 for releasably securing strap 36 and band 38 together about the user's wrist.

Housing 34 includes a front wall 40 within which a window is formed, and an emitter 42 is contained within a interior of housing 34. Emitter 42 is aligned with the window in housing front wall 40. In this manner, emitter 42 is operable to broadcast or emit a forwardly-projecting infrared signal, shown representatively at 44, which is adapted to be received by infrared transceiver 32 which is positioned behind the transparent cover plate of display 16. Identification member 30 includes an internal power supply (not shown), such as a battery, and an on/off switch 46. In this manner, when identification member 30 is turned on, the infrared generator contained within housing 34 is operable to emit signal 44 forwardly of the user's hand H.

In operation, the identification system of the present invention functions as follows. As shown in FIG. 4, the central controller 26 receives order data from an order database 48 operably connected to the controller 26. The controller 26 sends the order data to one of a number of "pick/put-to-light" (PTL) controllers 50 each associated with the group of storage racks 10 containing the selected order item. The PTL controller 50 interacts with the pick module 14 corresponding to the particular storage location 12 on which the selected item is located in a known manner so as to illuminate the indicator light 18 on the module 14 and to provide order identification and pick quantity information which is displayed on the module display 16. This alerts a user that a certain number of items from the corresponding storage location 12 are required for an order which is in the process of being filled by the user. The user then responds to illumination of indicator light 18, to ascertain whether the order information on display 16 corresponds to one of the orders being filed by the user. If it does, the user picks the appropriate quantity of items from the storage location 12, and places the items into the order receptacle, which is typically supported on roller conveyor 24 or which may be on a cart which is pushed through the order fulfillment area by the user. The user then actuates switch 20 as shown in FIG. 2, which serves to simultaneously shut off indicator light 18 and transmit a signal to the central controller 26 that the items have been removed from the corresponding storage location 12 for the order. The central controller 26 is programmed to then illuminate an indicator light 18 at another storage location 12 for the order, to indicate the next location of items to be placed into the order.

After receiving an order, the selected module 14 also sends out or emits a signal (not shown) from the transceiver 32. The signal attempts to query any identification member 30 located near the module 14. The range of the signal is very short, such that the identification member 30 must be approximately in the position shown in FIG. 2 for the signal to be received by the member 30. When the user's hand H is positioned as shown in FIG. 2 to actuate switch 20, the identification member 30 receives the signal from the transceiver 32 and generates a response signal. The response infrared signal, shown at 44, emitted from the transmitter 42 on the identification member 30 is received by infrared transceiver 32. Because the transceiver 32 is interconnected with the central controller 26, the signal 44 received by the transceiver 32 is transmitted through the PLT controllers 50 to the central controller 26. The infrared signal 44 from the identification member 30 has a unique frequency assigned to the particular user. Using data stored for each of the signals 44 in a signal database 52 connected to the central controller 26, the central controller 26 is able to recognize the identity of the user making the particular pick or removal of items from the storage location 12. Because an identification member 30 is worn by each person assigned to an order fulfillment area, the central controller 26 has a record of the identity of each person that removed items from each storage location 12 for filling orders. This allows the productivity of each user to be measured, and also identifies the person that may have made mistakes in filling an order by removing an incorrect number of items or by placing the removed items into the wrong order receptacle.

While the invention has been shown and described with respect to a particular embodiment, numerous variations are contemplated without departing from the present invention. The invention is considered to include any means for identifying the person removing items from a particular location for placement into an order. While a wrist-mounted infrared emitter 42 is illustrated which provides a signal to a stationary receiver mounted at the storage location, it is also contemplated that a radio frequency signal (or any other wireless signal) could be used in place of an infrared signal. Alternatively, alphabetic or numeric keys may be located adjacent pick module 14 and the user may enter his or her individual code either before or after actuating switch 20 for providing information to the central controller 26 as to the identity of the picker. While this type of identification system is not as efficient as the illustrated embodiment, it is lower in cost yet still provides identification information to the central controller 26. An additional alternative includes a finger print touch pad either incorporated into switch 20 or mounted adjacent switch 20, which identifies the user by corresponding the user's finger print with a database of finger print information stored in the central controller 26 or in another database. Further, the identification member 30 may be configured to continuously emit the signal 44 to ensure that the identification signal is transmitted to the transceiver 32. In addition, while a particular embodiment of the user-worn emitter is shown, it is understood that the emitter may take any other satisfactory form and may be mounted to parts of the user's body other than the user's hand, using any satisfactory mounting arrangement. Examples include, but are not limited to, physically attaching the emitter to an article of clothing or the like (e.g. a glove or hat) worn by the user, either permanently or using a removable attachment method such as hook-and-loop fasteners. In addition, other alternative identification methods may be employed, and the invention is not limited to the specific identification systems shown and described.

Further, while the invention has been illustrated in the context of a "pick-to-light" order fulfillment system, it is understood the invention is equally applicable to a cart-type batch order fulfillment system, as noted previously. The invention is also applicable in a "put-to-light" system, in which orders are batch picked and brought to sort stations which utilize "put" modules, with each sort location representing an order. The batch picked orders are then "put-to-light" as directed by the put modules. In addition, while the invention has been shown and described in the context of a zoneless-type system, it is understood the invention may also be used in a zone-type system for tracking productivity and accuracy.

It can thus be appreciated that the present invention allows an order fulfillment system 11 to operate in a zoneless mode, such that any picker can pick from any location on the system. This eliminates the need for SKU profiling and line balancing to equalize zones, which is required in a zone-type system. When in operation, the system of the present invention reduces work in process on a typical pick line. By tracking every pick to individual pickers, the accountability of individual pickers can be accurately assessed so as to increase picker productivity and reduce picker errors.

In operation, the order control module constantly emits a picker ID request to determine the identity of the picker. When the request signal from pick module 14 is received, identification member 30 is actuated so as to transmit its identification signal to the order control module. If a valid identification signal is received, the completed pick will be recorded for that picker and the order is then passed electronically by the central controller to the next bay or zone. If a valid identification signal is not received, the order will not be passed.

Various alternatives and embodiments are contemplated as being within the scope of the following claims particularly pointing out and distinctly claiming the subject matter regarded as the invention.

I claim:

1. An order fulfillment system for use by a plurality of users in filling orders, comprising:

a series of locations, wherein each location contains a plurality of items to be selected for placement into an order;

a signaling arrangement associated with each location for providing a signal to the users that one or more items from the location are required for placement into an order; and an identifying arrangement associated with each location for ascertaining and recording the identity of each user that handles items for placement into the orders, wherein the identifying arrangement includes a unique identification member carried by a portion of each user's body involved in order filling, and a passive receiving and recording arrangement at each location which interacts with each identification member for ascertaining and recording the identity of each user that removes an item from the location for placement into an order, wherein the passive receiving and recording arrangement is configured and arranged to identify the use automatically only when said portion of the user's body carrying the unique identification member is in the vicinity of the location from which the item is being removed for placement into an order.

2. The order fulfillment system of claim 1, wherein the signaling arrangement comprises a sensory signal emitter at each location, and a switch interconnected with the sensory signal emitter, wherein the switch is configured to be actuated by the user for terminating the signal where upon removal of one or more items from the location by the user, and wherein the passive receiving and recording arrangement is configured and arranged to interact with the unique identification member to ascertain and record the identity of the user when the user actuates the switch to terminate the sensory signal.

3. The order fulfillment system of claim 1, wherein the unique identification member comprises a signal emitter carried by each user, wherein each signal emitter is operable to emit a unique signal which corresponds to the identity of the user.

4. The order fulfillment system of claim 3, wherein the passive receiving and recording arrangement is located in the vicinity of the switch and is operable to receive the signal from the signal emitter when portion of the user's body is in position adjacent the switch so as to actuate the switch to terminate the signal upon removal of the one or more items from the location.

5. The order fulfillment system of claim 1, wherein the passive receiving and recording arrangement is in the form of a receiver at each location which receives a signal emitted by the unique identification member, and a memory which is operable to record information from the signal which corresponds to the identity of the user.

6. An order fulfillment system for use by a plurality of users in filling orders in an area having a series of locations comprising:
   a signaling arrangement associated with each location for providing a signal to the users that one or more items are required for placement into an order, wherein the signaling arrangement comprises a sensory signal emitter at each location, and a switch interconnected with the sensory signal emitter and manually actuable by the user for terminating the signal when the user has removed the one or more items from the location; and
   an identifying arrangement associated with each location for ascertaining and recording the identity of each user that handles items for placement into the order, wherein the identifying arrangement includes an identification member carried by each user, and a receiving and recording arrangement at each location which interacts with each identification member for ascertaining and recording the identity of each user;
   wherein the identification member is secured to the user in the vicinity of the user's hand, wherein the receiving and recording arrangement includes an input area in the vicinity of the switch for interacting with the identification member when the user's hand is positioned so as to manipulate the switch.

7. An order fulfillment method for use by a plurality of users in filling an order, comprising the steps of:
   providing a sensory signal to the users that one or more items from the location are required for placement into the order, wherein a switch is interconnected with the sensory signal emitter and is configured such that actuation of the switch terminates the sensory signal;
   manually handling one or more items at a location for placement into the order;
   actuating the switch to terminate the sensory signal upon removal of the one or more items from the location for placement into the order; and
   ascertaining and recording the identity of the user that manually handles the items at the location upon actuation of the switch to terminate the sensory signal, wherein the steps of ascertaining and recording the identity of the user are carried out via a unique identification member carried by each user, and passively interacting with each identification member when a portion of the user's body carrying the unique identification member is in the vicinity of the switch to terminate the sensory signal from the location at which the item is being removed for placement into an order.

8. The method of claim 7, wherein the step of ascertaining and recording the identity of the user is carried out by sensing an identifying signal emitted from the identification member carried by the user.

9. The method of claim 8, wherein the identification member is carried by the user in the vicinity of the user's hand.

10. The method of claim 8, further comprising the step of storing the identifying signals in a memory device remote from the location at which the one or more items are handled by the user.

11. An identification arrangement for an order fulfillment system including a plurality of item storage locations and a signaling arrangement for signaling to a plurality of users that an item is to be handled at the location for placement into an order, for identifying the user that handles the item at the location, comprising:
   a unique identification member carried by the user which emits a unique signal corresponding to the identity of the user, wherein the unique identification member is carried by the user in the vicinity of at least one of the user's hands; and
   a receiver associated with the location for receiving the unique signal;
   wherein the signaling arrangement includes a sensory indicator which provides an indication to the plurality of users that an item is to be handled at the location, and a manually operable switch adapted to be manipulated by the operator for terminating the sensory indicator, and wherein the receiver is located in the vicinity of the switch and interacts with the identification member when the user manipulates the switch to terminate the sensory indicator.

12. The identification arrangement of claim 11, wherein each receiver and switch are incorporated in a module mounted adjacent the location from which one or more items are to be handled by a user.

13. An identification arrangement for an order fulfillment system having a number of storage locations containing items to be placed in an order, comprising an identification input associated with each location for identifying a user that handles the item at the location, wherein the identification arrangement comprises:
   a signaling arrangement for providing a signal to the users that one or more items from the location are required for placement into an order, wherein the signaling arrangement comprises a sensory signal emitter, and a switch interconnected with the sensory signal emitter, wherein the switch is actuable by one of the users for terminating the signal upon removal of one or more items from the location for placement into the order; and an identifying arrangement for ascertaining and recording the identity of each user that handles items for placement into the order, wherein the identifying arrangement includes a unique identification member carried by a portion of each user's body involved in order filling, and a passive receiving and recording arrangement which interacts with each identification member for ascertaining and recording the identity of each user that removes an item from the location for placement into an order, wherein the passive receiving and recording arrangement is configured and arranged to identify the user automatically only when said portion of the user's body carrying the unique identification member is in the vicinity of the location from which the item is being removed for placement into an order.

14. The identification arrangement of claim 13 wherein the identifying arrangement is configured and arranged to interact with the unique identification member to ascertain and record the identity of the user when the user actuates the switch to terminate the sensory signal.

15. The identification arrangement of claim 14 wherein the unique identification member emits a signal that is received by the receiving and recording arrangement to identify the user upon actuation of the switch to terminate the sensory signal.

* * * * *

UNITED STATES PATENT AND TRADEMARK OFFICE
CERTIFICATE OF CORRECTION

PATENT NO. : 6,762,681 B1 Page 1 of 1
DATED : July 13, 2004
INVENTOR(S) : Darin L. Danelski It is certified that error appears in the above-identified patent and that said Letters Patent is hereby corrected as shown below:

Column 6,
Line 62, delete "orders" and substitute therefor -- order --;

Column 7,
Line 6, delete "use" and substitute therefor -- user --;
Line 14, after "signal" delete "where";
Line 29, after "when" insert -- a --;
Line 40, after "locations" insert -- , --.

Signed and Sealed this

Seventh Day of September, 2004

JON W. DUDAS
*Director of the United States Patent and Trademark Office*